Patented Sept. 16, 1952

2,610,922

UNITED STATES PATENT OFFICE 2,610,922

REFLEX-REFLECTOR LENS ELEMENTS

Warren R. Beck, Mahtomedi, Minn., assignor to Minnesota Mining & Manufacturing Company, St. Paul, Minn., a corporation of Delaware No Drawing. Application March 14, 1950, Serial No. 149,653

3 Claims. (Cl. 106—54)

This invention relates to small glass beads or sphericles suitable for incorporation into highway striping paints as reflex-reflective lens elements.

Painted highway centerlines and cross-walks have been made strikingly visible to nighttime motorists by the inclusion in the paint layer of small transparent glass beads or sphericles. These tiny particles, in conjunction with the reflective pigment of the paint, act to reflect the incident light from the headlights back toward its source and thus to make the painted area visible to the motorist.

The optical principles involved require that glass of a fairly high refractive index be used in order to provide maximum reflex reflection without undue angularity. Thus, while some beads having a refractive index in the neighborhood of 1.55, or even slightly lower, have in the past been used for centerline striping, much better results in terms of increased apparent brightness of the line are obtained with beads whose refractive index is at least about 1.60 and preferably within the approximate range of 1.65–1.70.

In a typical test, a beaded centerline containing beads having a refractive index of 1.53 provided a reflex-reflection of 1.7 candlepower (per foot-candle per square foot), while a similar centerline containing beads with a refractive index of 1.67 showed a reflection of 2.7 candlepower, an increase in brilliance of more than 50%.

Another requirement is that the glass sphericles be highly resistant to weathering. Any change in shape or transparency, clouding or pitting of the surface, discoloration, leaching of soluble components, or the like, such as may be observed during prolonged exposure of many types of glass to moisture and sunlight, diminishes the effectiveness of the beads. Such changes are particularly noticeable in connection with beads of particles of extremely small size, whereas in the form of larger masses of a particular composition no change would be observable.

An obvious requirement, for the application described, is that the bead shape closely approximate a sphere. A number of processes have been devised for the production of spherical glass bodies in small sizes, generally involving free suspension of particles in a hot zone for a time and at a temperature sufficient to permit each particle to be drawn into a spherical shape by surface tension. For economical commercial production of glass beads, it is important that the viscosity of the glass at reasonable melting temperatures be kept at a minimum. High temperatures increase the fluidity of the glass and reduce the time required for the particles to assume the desired spherical shape, but are found additionally to deepen the color of the particles to an undesirable extent. High temperatures also involve rapid corrosion of refractories, increased costs, etc. Hence it is desirable to keep the temperature at a minimum both in melting the glass and in forming the beads.

Requirements of high index, weather-resistance, and spherical shape are common to glass beads used in reflex-reflector surfaces whether on the highway or on signboards, vehicles, or for other outdoor applications. An additional requirement of beads designed for highway centerstriping and the like is high mechanical strength or breakage resistance. Both hardness and toughness of the glass particles are involved. It has been found that this combination of properties may be successfully evaluated, and correlated with results obtained in normal use, by means of a crushing test in which individual beads of a specified size are subjected to uniformly increasing load until failure occurs.

The prior art has provided glass beads which were suitable in a number of respects for highway centerline application, but were invariably unsuitable in other respects. For example, beads having high crushing resistance and satisfactory weather resistance but which were undesirably low in refractive index have been made available. Again, small glass beads having desirable hardness and refractive index were found to be inferior in weather resistance and other properties. Prior to the present invention, to the best of my knowledge, there have never been produced glass compositions or glass beads having all of the properties required for successful application to the reflex reflectorizing of highway centerlines. In particular, such beads or sphericles have never been produced in commercial quantities and at commercially useful rates.

Incorporation of titania in prior art glass compositions, for examples, has provided weather-resistant glass having high refractive index, but such glasses have been high in viscosity and particularly difficult to form into beads. Certain soda-lime-silica glasses have also been tested for highway striping beads. In general, irregular particles of these glasses do not readily become spherical because of the relatively high viscosity of the glass at the usual bead-forming temperatures. Reducing the viscosity, e. g. by increasing the alkali or fluorine content, reduces the weather-resistance of the beads. The conventional soda-lime-silica formulas are low in refractive index and do not provide the desired high brilliance in the beaded centerline. Nevertheless, the soda-lime-silica type of glass bead, prior to my invention, has been used almost exclusively in beaded highway centerlines and the like.

The present invention provides glass beads or sphericles suitable for incorporation into painted highway centerlines and the like and having fully adequate weather resistance and breakage resistance as well as improved refracting powers for such application. The beads may be produced in quantity and at commercially attractive rates, due to the temperature viscosity characteristics inherent in the glass composition. There are other advantages, but the foregoing are believed sufficiently to characterize my invention.

I have discovered that certain complex aluminosilicate glasses containing a considerable proportion of titanium are capable of being readily and quickly formed into accurately shaped beads or sphericles having the desired combination of properties.

*Example*

One glass which has given exceptionally good results in the form of small glass beads or sphericles when tested in painted highway centerline stripes under actual use conditions has the following composition as calculated from its batch, the proportions being given in parts by weight:

| | |
|---|---|
| $SiO_2$ | 26.35 |
| $Al_2O_3$ | 16.25 |
| $TiO_2$ | 15.20 |
| MgO | 13.45 |
| CaO | 15.25 |
| $B_2O_3$ | 7.40 |
| $Na_2O$ | 4.70 |
| $F_2$ | 1.40 |
| Total | 100.00 |

Irregular particles of glass having the above composition, when freely suspended in air and heated to about 1200° C., were rapidly converted to spherical beads. The resulting beads were well-formed, had a refractive index of about 1.67, were extremely durable both in accelerated chemical tests and under outdoor weathering conditions, and had a high breakage resistance value. The beads were of a faint golden color, which was of advantage where they were used with typical yellow centerline paint. The painted and beaded line was brilliantly reflex-reflective.

The following are typical formulations of raw materials which can be combined and processed to make the novel beads or sphericles having the calculated composition of the foregoing specific example.

| | 1 | 2 | 3 |
|---|---|---|---|
| Silica | 26.0 | 26.0 | 26.0 |
| Aluminum hydrate | 24.7 | 24.7 | 24.7 |
| Raw dolomite | | | 43.0 |
| Calcined dolomite | | 22.5 | |
| Soda ash | 7.9 | 7.9 | 7.9 |
| Fluorspar | 2.8 | 2.8 | 2.8 |
| Titania | 15.0 | 15.0 | 15.0 |
| Boric acid | 12.9 | 12.9 | 12.9 |
| Magnesia | 14.8 | 4.0 | 4.0 |
| Calcium carbonate | 23.2 | | |

Other raw materials and combinations may equally well be employed in compounding this and other specific formulas coming within the scope of the invention, as will be readily appreciated by those skilled in the art. Sodium fluoride, for example, may serve as a source of fluorine and sodium; sodium nitrate may be used in place of soda ash; borax may replace an equivalent amount of boric acid and soda ash; kaolin, if sufficiently free of impurities, may be used as a source of both silica and alumina.

In general, raw materials are selected which are substantially free of color-imparting impurities, particularly iron, thus making unnecessary the addition of known chemical decolorizers, e. g. antimony or arsenic oxides.

Reasonably accurate estimations of the chemical durability and weather resistance of the beads under use conditions may be made on the basis of chemical tests such as the leaching test. In this test, a sample of the beads is crushed, and a weighed portion passing through a 48 mesh but not a 109 mesh silk screen is boiled for a definite time in water, which with the rinse water from three separate rinsings, is then titrated with standard acid, using phenolphthalein indicator. The number of milliliters of tenth-normal acid required to neutralize the extract of 10 grams of glass boiled for one hour in 100 ml. of water is taken as the alkalinity number. It has been found that beads designed for outdoor use should have an alkalinity number of less than about 5. Beads of the composition given above had an alkalinity number of between 0.4 and 1.0, and were highly weather-resistant.

As hereinbefore mentioned, the mechanical strength of the beads, or breakage resistance, has been determined by crushing individual beads under a uniformly increasing load. In one form of test apparatus, the bead is placed on a flat anvil beneath a flat hammer, both of hardened polished tool steel, and the weight on the hammer is increased uniformly and without vibration at the rate of 1,000 grams per second until the bead fails. Beads screened through a 40-mesh and on a 50-mesh screen are selected for test, and an average value is taken for at least 100 beads. In this test, the untreated beads of the example resisted crushing at stresses of up to about 6000 grams, whereas crushing strengths substantially less than this value, e. g. above about 4500 grams, have been found ample for most highway centerline applications.

Based on the results obtained with a large number of compositions somewhat analogous to that of the foregoing specific example, I have found that in order to provide the desired combination of properties, the weight percentages of the individual components must come within the approximate limits here set forth.

*Compositional limits in weight percent*

| | |
|---|---|
| $SiO_2$ | 15–35 |
| $Al_2O_3$ | 8–25 |
| $TiO_2$ | 8–25 |
| MgO | 2–15 |
| CaO | 8–24 |
| $B_2O_3$ | 0–15 |
| $Na_2O$ | 0–10 |
| $F_2$ | 0–5 |

A number of additional relationships must also be observed. The total amount of $TiO_2$ and $Al_2O_3$ must lie within about 20–50 percent, preferably 25–35 percent, and the ratio of $Al_2O_3$ to $TiO_2$ must be within about 1:3 to 3:1 or, for best results, from about 1:2 to about 2:1. The sum of the $SiO_2$, $Al_2O_3$ and $TiO_2$ must lie within about 40–75 percent, preferably 45–65 percent where the total amount of $Al_2O_3$ and $TiO_2$ is within the preferred range of 25–35 percent. The total of MgO, CaO, $B_2O_3$, $Na_2O$ and $F_2$ must be at least about 25, and preferably at least about 35 percent of the composition. The total of $Na_2O$ and $F_2$ must lie within about 1–13 percent, and these materials together with the $B_2O_3$ must total about 5–25 percent, preferable narrower ranges being about 4–10 and about 10–20 percent, respectively. A further limitation is that, where the total of $SiO_2$, $Al_2O_3$ and $TiO_2$ is about 60 percent or more, the total of $Na_2O$ and $F_2$ must be at least about $\frac{1}{12}$ of that value.

Glasses coming within the broader proportional relationships hereinabove expressed are found to have refractive indices lying between about 1.64 and about 1.74. Within the more specific proportions, the values obtained are about 1.65–1.69.

These glasses may be characterized as consisting primarily of the oxides of silicon, aluminum, titanium, magnesium, calcium, and at least one of boron and sodium. At least this degree of complexity is found to be essential for proper viscosity-temperature relationships in the preparation of the beads. Other components may be included in relatively small proportions in addition to these primary materials, or in somewhat larger amounts as replacements for portions of the primary materials. Small proportions of zinc, lead, phosphorous and zirconium oxides have, for example, been added to these compositions, in total amounts of substantially less than about 10 percent based on 100 percent of the primary formula. Zinc, lead and phosphorous in small amounts tend to improve the fluidity of the glass; lead also increases the refractive index; and zirconium, phosphorous and zinc all contribute to weather-resistance.

Barium and strontium oxides have been substituted for minor or even for considerable proportions of the magnesium and calcium oxides. Formulas calling for only a few percent of calcium or magnesium oxides may have one of these components replaced completely by barium or strontium oxide; thus where the MgO content is 2–5%, it may be replaced completely by BaO. Where larger proportions of the primary oxides are employed, partial replacement only is allowable, since the presence of even moderately large proportions of barium and strontium tend to reduce the crushing resistance of the resulting beads. On the other hand, the increased complexity of the glass resulting from the addition of small amounts of these components is of advantage in providing improved fluidity.

Sodium oxide is ordinarily a component of the glass, serving to flux or fluidize the melt. Fluorine (e. g. as calcium fluoride) serves the same purpose and may be substituted in these glasses, within the limitations given, for all or part of the sodium oxide. Potassium oxide ordinarily has been thought to provide the same effect. I have discovered, however, that substitution of potassium for sodium in these compositions greatly reduces the weather-resistance of the resulting beads. This is surprising, since it had long been believed that a mixture of sodium and potassium oxides provided improved durability over either component alone.

These glass compositions may, as previously indicated, be converted into tiny glass beads or sphericles by suspending small particles of the glass in air at a moderately high temperature for a brief time until the surface tension of the fluidized glass particles causes them to become spherical, and then quickly cooling the particles. The resulting beads or sphericles are found to be transparent and to provide superior reflex-reflective lens elements for use in painted highway centerlines and analogous applications.

Having described various embodiments of my invention for purposes of illustration, but without intent to be limited thereto, what I claim is as follows:

1. Transparent, weather-resistant, strong and tough, small glass beads or sphericles having a refractive index of about 1.67 and a weight composition, as calculated from the batch, substantially as follows:

| | |
|---|---|
| $SiO_2$ | About 26.35 |
| $Al_2O_3$ | About 16.25 |
| $TiO_2$ | About 15.20 |
| $MgO$ | About 13.45 |
| $CaO$ | About 15.25 |
| $B_2O_3$ | About 7.40 |
| $Na_2O$ | About 4.70 |
| $F_2$ | About 1.40 |

2. Transparent, weather-resistant, strong and tough, small glass beads or sphericles having a refractive index of about 1.64–1.74 and suitable for incorporation as reflex-reflective lens elements in painted highway center stripes, the components of the glass composition consisting essentially of the first five and at least one of the last three of the following in the indicated weight percent as calculated from the batch:

| | |
|---|---|
| $SiO_2$ | 15–35 |
| $Al_2O_3$ | 8–25 |
| $TiO_2$ | 8–25 |
| $MgO$ | 2–15 |
| $CaO$ | 8–24 |
| $B_2O_3$ | up to 15 |
| $Na_2O$ | up to 10 |
| $F_2$ | up to 5 | wherein the total of $SiO_2$, $Al_2O_3$ and $TiO_2$ is about 40–75, the total of $Al_2O_3$ and $TiO_2$ is about 20–50, the total of $Na_2O$ and $F_2$ is about 1–13, the total of $B_2O_3$, $Na_2O$ and $F_2$ is about 5–25, the total of $MgO$, $CaO$, $B_2O_3$, $Na_2O$ and $F_2$ is about 25–60, the ratio of $Al_2O_3$ to $TiO_2$ is about 1:3–3:1, and, where the total percent of $SiO_2$, $Al_2O_3$ and $TiO_2$ is about 60–75, the total of $Na_2O$ and $F_2$ is at least one-twelfth of said total percent.

3. Transparent, weather-resistant, strong and tough, small glass beads or sphericles having a refractive index of about 1.65–1.69 and suitable for incorporation as reflex-reflective lens elements in painted highway center stripes, the components of the glass composition consisting essentially of the first five and at least one of the last three of the following in the indicated weight percent as calculated from the batch:

| | |
|---|---|
| $SiO_2$ | 15–35 |
| $Al_2O_3$ | 8–25 |
| $TiO_2$ | 8–25 |
| $MgO$ | 2–15 |
| $CaO$ | 8–24 |
| $B_2O_3$ | up to 15 |
| $Na_2O$ | up to 10 |
| $F_2$ | up to 5 | wherein the total of $SiO_2$, $Al_2O_3$ and $TiO_2$ is about 45–65, the total of $Al_2O_3$ and $TiO_2$ is about 25–35, the total of $Na_2O$ and $F_2$ is about 4–10, the total of $B_2O_3$, $Na_2O$ and $F_2$ is about 10–20, the total of $MgO$, $CaO$, $B_2O_3$, $Na_2O$ and $F_2$ is about 35–55, the ratio of $Al_2O_3$ to $TiO_2$ is about 1:2–2:1, and, where the total percent of $SiO_2$, $Al_2O_3$ and $TiO_2$ is about 60–65, the total of $Na_2O$ and $F_2$ is at least one-twelfth of said total percent.

WARREN R. BECK.

REFERENCES CITED

The following references are of record in the file of this patent:

UNITED STATES PATENTS

| Number | Name | Date |
|---|---|---|
| 2,517,459 | Armistead | Aug. 1, 1950 |